United States Patent Office 2,810,730
Patented Oct. 22, 1957

2,810,730

PROCESS FOR MAKING ESTERS OF BIS(4-HYDROXYCOUMARIN-3-yl) ACETIC ACID

Karel Fucik, Modrany u Prahy, and Zelimir Prochazka, Prague, Czechoslovakia

No Drawing. Application February 26, 1952, Serial No. 273,572

Claims priority, application Czechoslovakia December 30, 1948

8 Claims. (Cl. 260—343.2)

The present invention relates to a process of making derivatives of bis(4-hydroxycoumarin-3-yl) acetic acid and more particularly to the preparation of esters of bis(4-hydroxycoumarin-3-yl) acetic acid.

The present invention is a continuation-in-part application of copending application Serial No. 113,491 for "Process of Manufacture of the Lacton of the Bis-4-Hydroxycoumarinyl Acetic Acid" and of copending application Serial No. 113,492, filed August 31, 1949, for "Process of Manufacture of Esters of the Bis-4-Hydroxycoumarinylacetic Acid," both now abandoned.

It is an object of the present invention to provide a process for preparing esters of bis(4-hydroxycoumarin-3-yl) acetic acid by direct esterification without the formation of physiologically inactive epoxides.

It is a further object of the present invention to provide a process for the preparation of the dehydration product of bis(4-hydroxycoumarin-3-yl) acetic acid, which dehydration product can be directly and easily esterified.

It is a still further object of the present invention to provide a process for the preparation of the dehydration product of bis(4-hydroxycoumarin-3-yl) acetic acid having the hydroxy group in the 4 position unreacted and unfixed.

With the above objects in view the present invention mainly consists of subjecting bis(4-hydroxycoumarin-3-yl) acetic acid to the action of a dehydration agent, which dehydrating agent does not react with or bind the hydroxyl group in the 4 position. The thus formed dehydrated reaction product is then refluxed with an alcohol thereby forming the alcohol ester of this coumarin derivative.

It is well known that some derivatives of courmarin and of bis(4-hydroxycoumarin-3-yl) acetic acid have an outstanding physiological action. Some of the esters of the above mentioned acid have turned out particularly well clinically. It has however, in the past been difficult to prepare these esters cheaply. The usual method of the manufacture of these esters by the direct esterification of the corresponding acid has substantial disadvantages. The major disadvantage in this respect is as to the formation of epoxides as by-products of the reaction, which epoxides are entirely inactive from the physiological point of view.

The disadvantages of this method have been avoided by the process of the present invention wherein the esterification is not carried out on the bis(4-hydroxycoumarin-3-yl) acetic acid but is carried out directly on the dehydration product—the dehydrated form of this substance.

It is an object of the present invention to provide a method of preparing the dehydrated product of bis(4-hydroxycoumarin-3-yl) acetic acid and of the esterification of the same.

It could be presumed, according to known phenomena that a lactone will be formed by the dehydration of the bis(4-hydroxycoumarin-3-yl) acetic acid, since this acid has always been considered and in fact has been called an hydroxy-acid, which class of acids is known to be easily lactonized. However, such is not the case in this compound. Bis(4-hydroxycoumarin-3-yl) acetic acid reacts to dehydration as a keto-acid rather than a hydroxyacid.

It has now been established that the above mentioned acid does not behave as a hydroxy acid when reacted with a dehydrating agent but rather as stated above, as a keto-acid. As a matter of fact this acid is characterized by its tendency towards keto-enol tautomerism. Its ketoform may be considered as 3,3-carboxymethylen-bis-(2,4-diketochroman) with the following structural formula:

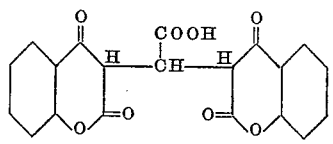

and the enol-form is the 3,3'-carboxymethylen-bis-(4-hydroxycoumarin) with the structural formula as follows:

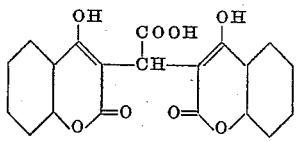

It has been further found that the dehydration of this tautomeric substance does not proceed to form a lactone, as would be expected from a hydroxy acid, but rather towards the formation of a compound which may be expressed with the maximum probability as 3-[2,3-(coumarin - 3',4' - yl) - 5 - hydroxyfuran - 4 - yl]-4-hydroxycoumarin with the structural formula:

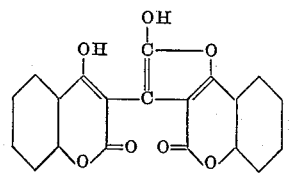

This structural formula has been arrived at by the use of some characteristic reaction of the substance, such as from the formation of its dimethoxy derivative with the structural formula:

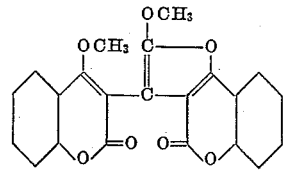

The diethylamine salt of the enol-form of this substance has also been prepared, the formation of which is further proof of the probability of the above defined structure for the dehydration product of bis(4-hydroxycoumarin-3-yl) acetic acid.

The choice of the dehydrating agent has particular importance in the course of the reaction, in guaranteeing the formation of only physiologically active esters of bis(4-hydroxycoumarin-3-yl) acetic acid, when reacted with alcohols. In order to insure the proper formation of these desirable esters, the hydroxy group in position 4 must remain unsubstituted and free after dehydration, since said group takes part in the keto-enol tautomerism. It is therefore necessary to choose that means of dehydration, with such dehydrating agent, such that there will be no reaction with the hydroxy group in position 4. This hydroxy group is therefore free to take part in the tautomerism. It is also important that this hydroxy group remain free and not fixed in the enol-form, i. e. by acylation, methylation, etc. The fixation of this group into the enol-form results in an asymmetric, very labile structure, which when given further treatment such as esterification, leads to the formation of certain esters which are undesirable.

The process of the present invention is preferably carried out by using as dehydrating agent, acetic acid, thionyl chloride, sulfurous acid, phosphoroxychloride or any other dehydrating agent which will not attack the hydroxy group in position 4.

It is of prime importance that the dehydrating agent does not react with or fix the position 4 hydroxy group. The best dehydrating agents for this purpose are therefore glacial acetic acid and/or thionyl chloride. These substances apparently, because of their chemical nature are either unable to react with the hydroxy group in position 4, or in case of reaction at that position, the formed product is unstable and decomposes instantly after the reaction.

The thus formed dehydration product of bis(4-hydroxycoumarin-3-yl) acetic acid is found to be a white crystalline substance having a melting point of 285° C. This new substance, which has the hydroxy group in the 4 position free, is difficultly soluble in common solvents and may, if purification is desired, be recrystallized from such solvent, i. e. cyclohexanol.

Study of the structural formulas of the reaction products of bis(4-hydroxycoumarin-3-yl) acetic acid leads to the conclusion that the dehydration product of this substance has the name 3 - [2,3 - (coumarin - 3',4' - yl)-5-hydroxyfuran - 4 - yl] - 4 - hydroxycoumarin with the structural formula given above. It may therefore be seen that the product of dehydration of bis(4-hydroxycoumarin-3-yl) acetic acid does not have both hydroxy groups free but only retains one free hydroxy group. The term "hydroxy group in the 4 position free" refers to this one free hydroxy group, the other hydroxy group being fixed as shown in the structural formula. This 4 position refers to the hydroxy group on either ring, the other hydroxy group being fixed by the dehydration, as shown.

The thus produced dehydrated reaction product of bis(4-hydroxycoumarin-3-yl) acetic acid may then by the process of the present invention be transformed in excellent yields into the ester of bis(4-hydroxycoumarin-3-yl) acetic acid. The thus formed esters are free of impurities and furthermore free of physiologically inactive substances. They are therefore immediately usable in medicine.

The formation of these esters is carried out by esterifying the dehydration product with an alcohol. For the purpose of esterification any alcohol may be used such as methanol, ethanol, propanol, n-butanol, allyl alcohol, n-hexanol, n-heptanol, isopropanol, isobutanol, cyclohexanol, benzylalcohol, ethylene glycol, etc. From the pharmacological standpoint the most suitable alcohols are the lower aliphatic alcohols, especially those with not more than 6 carbon atoms. From the chemical standpoint however, there is no difference, any alcohol being suitable.

The esterification is carried out by refluxing a mixture of the dehydration product of bis(4-hydroxycoumarin-3-yl) acetic acid with an alcohol, which mixture is then refluxed, at the boiling point, thereby forming the ester of bis(4-hydroxycoumarin-3-yl) acetic acid. The particular ester formed, of course depends upon the alcohol used.

In this way it is possible to obtain the following physiologically active and medically useful esters:

| | M. P., ° C. |
|---|---|
| Methyl ester | 203–206 |
| Ethyl ester | 176 |
| Propyl ester | 143–144 |
| n-Butyl ester | 154–155 |
| Allyl ester | 132 |
| n-Hexyl ester | 121–122 |
| n-Heptyl ester | 124–125 |
| Isopropyl ester | 203–204 |
| Isobutyl ester | 170–171 |
| n-Cetyl ester | 108–109 |
| Ethylene glycol ester | 122–127 |
| Propylene glycol ester | 183 |

The following examples are given as preferred embodiments of the present invention, the scope of said invention not however being limited thereto.

EXAMPLES OF THE DEHYDRATION

*Example I*

One part of bis(4-hydroxycoumarin-3-yl) acetic acid is mixed with one part of phosphorous oxychloride, in a medium consisting of tetrachloromethane or trichloroethylene. The mixture is heated for about 1 hour, preferably under refluxing conditions and a crystalline product is thus formed. It is possible to separate this crystalline product by filtration or any other suitable means. This reaction product is a white crystalline substance melting at 285° C. and having the hydroxy group in the 4 position, free. It is difficultly soluble in common solvents and may be recrystallized for example from cyclohexanol. It is possible to treat the further part of the acid in the mother liquors.

*Example II*

One part of bis(4-hydroxycoumarin-3-yl) acetic acid is mixed with slightly more than one part of thionylchloride in a medium of tetrachloromethane or trichloroethylene. The mix is refluxed. The crystalline product which is thus formed and separated is white and has a melting point of 285° C.

*Example III*

20 grams of bis(4-hydroxycoumarin-3-yl) acetic acid is refluxed with 80 cc. of acetic acid. After a short time a crystalline substance melting at 285° C. is formed.

EXAMPLES OF ESTERIFICATION

*Example IV*

36.2 grams of the dehydration product prepared from the bis(4-hydroxycoumarin-3-yl) acetic acid according to the preceding examples, and having the hydroxyl group in the 4 position free, is refluxed with 150 ml. absolute ethanol (which may be denatured with benzene for economy purposes). This refluxing is carried on for about 4–5 hours, and the ethyl ester of bis(4-hydroxycoumarin-3-yl) acetic acid is thus produced. The thus obtained form of the ester with a lower melting point, may be transformed by further heating into the form with a higher melting point of 176° C.

*Example V*

36.2 grams of the same dehydration product of bis(4-hydroxycoumarin-3-yl) acetic acid as in the previous example, is heated with 150 ml. of isobutyl alcohol. This mixture is refluxed for about 4 hours during which time a solution is formed containing the isobutyl ester.

This solution is then boiled to about half its volume, the isobutyl ester precipitating out. The thus formed isobutyl ester may be separated from the evaporated solution, by filtration, and has a melting point of 174° C.

In the same manner any aromatic ester of said acid may be prepared.

Example VI 36.2 grams of the same dehydration product of bis(4-hydroxycoumarin-3-yl) acetic acid as in the previous example, is boiled for about 20 minutes with 60 ml. of benzyl alcohol, under refluxing conditions. After being cooled the benzyl ester precipitates from solution. Upon separation it is found to melt at 185–186° C.

Example VII 36.2 grams of the same dehydration product of bis(4-hydroxycoumarin-3-yl) acetic acid as in the previous example, is heated under refluxing conditions with ethylene chlorhydrin for 4 hours. A clear solution is thus formed. The clear solution is then boiled, so as to evaporate the solvent thereby crystallizing the chloroethyl ester of the bis(4-hydroxycoumarin-3-yl) acetic acid, said ester having melting point of 194° C.

Example VIII 15 grams of the same dehydration product is heated with about 50 ml. of allylalcohol, under refluxing conditions. The solution thus formed is boiled so as to evaporate the major part of the solvent therefrom, thereby precipitating out of solution the allyl ester. About 15 grams of this ester may be thus recovered, said ester having a melting point of 132° C.

While the invention has been illustrated and described as embodied in a process for the preparation of esters of bis(4-hydroxycoumarin-3-yl) acetic acid, it is not intended to be limited to the details shown, since various modifications may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Process for preparing ester derivatives of bis(4-hydroxycoumarin-3-yl) acetic acid, comprising in combination the steps of mixing bis(4-hydroxycoumarin-3-yl) acetic acid with a dehydrating agent therefor selected from the group consisting of phosphorousoxychloride, thionylchloride, sulfurous acid and acetic acid, which dehydrating agent does not react with the hydroxyl group in the 4 position on said bis(4-hydroxycoumarin-3-yl) acetic acid in a non-aqueous solvent therefor, refluxing said mixture so as to cause said bis(4-hydroxycoumarin-3-yl) acetic acid and said dehydrating agent to react and form a reaction mass including the dehydrated reaction product of said bis(4-hydroxycoumarin-3-yl) acetic acid; separating said dehydrated reaction product from said reaction mass, mixing said thus separated reaction product with an aliphatic alcohol having a maximum of 6 carbon atoms, and refluxing said mixture of said thus separated reaction product with an alcohol so as to form the alcohol ester derivative of bis(4-hydroxycoumarin-3-yl) acetic acid.

2. Process for preparing ester derivatives of bis(4-hydroxycoumarin-3-yl) acetic acid, comprising in combination the steps of mixing bis(4-hydroxycoumarin-3-yl) acetic acid with a dehydrating agent therefor selected from the group consisting of phosphorousoxychloride, thionylchloride, sulfurous acid and acetic acid, which dehydrating agent does not react with the hydroxyl group in the 4 position on said bis(4-hydroxycoumarin-3-yl) acetic acid, refluxing said mixture so as to cause said bis(4-hydroxycoumarin-3-yl) acetic acid and said dehydrating agent to react and form a reaction mass including the dehydrated reaction product of said bis(4-hydroxycoumarin-3-yl) acetic acid, separating said dehydrated reaction product from said reaction mass; mixing said thus separated reaction product and an aliphatic alcohol having a maximum of 6 carbon atoms, refluxing said mixture of said reaction product and an alcohol, thereby forming a solution containing the alcohol ester derivative of bis(4-hydroxycoumarin-3-yl) acetic acid, boiling said solution containing said ester so as to evaporate a major portion of the solvent therefrom, thereby causing said ester to precipitate from the thus evaporated solvent, and separating said thus crystallized ester from the thus evaporated solvent thereby obtaining a crystalline ester of bis(4-hydroxycoumarin-3-yl) acetic acid.

3. In a process for preparing esters of bis(4-hydroxycoumarin-3-yl) acetic acid, the steps of mixing bis(4-hydroxycoumarin-3-yl) acetic acid with a dehydrating agent therefor selected from the group consisting of phosphorousoxychloride, thionylchloride, sulfurous acid and acetic acid, which dehydrating agent does not react with the hydroxyl group in the 4 position on said bis(4-hydroxycoumarin-3-yl) acetic acid; and refluxing said mixture so as to cause said bis(4-hydroxycoumarin-3-yl) acetic acid to react and form the dehydrated reaction product of bis(4-hydroxycoumarin-3-yl) acetic acid, said dehydrated product having the hydroxy group in the 4 position free.

4. In a process for preparing esters of bis(4-hydroxycoumarin-3-yl) acetic acid, the steps of mixing an aliphatic alcohol having a maximum of 6 carbon atoms with the dehydrated product of bis(4-hydroxycoumarin-3-yl) acetic acid having the hydroxy group in the 4 position free

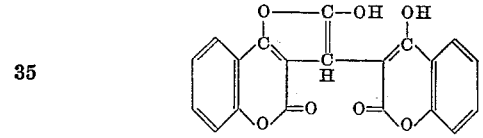

and refluxing said mixture of said dehydrated product and said alcohol so as to form the alcohol ester derivative of bis(4-hydroxycoumarin-3-yl) acetic acid.

5. Process for preparing ester derivatives of bis(4-hydroxycoumarin-3-yl) acetic acid, comprising in combination the steps of mixing bis(4-hydroxycoumarin-3-yl) acetic acid with a dehydrating agent therefor selected from the group consisting of phosphorousoxychloride, thionylchloride, sulfurous acid and acetic acid, which dehydrating agent does not react with the hydroxyl group in the 4 position on said bis(4-hydroxycoumarin-3-yl) acetic acid, refluxing said mixture so as to cause bis(4-hydroxycoumarin-3-yl) acetic acid and said dehydrating agent to react and form a reaction mass including the dehydrated reaction product of said bis(4-hydroxycoumarin-3-yl) acetic acid, separating said dehydrated reaction product from said reaction mass, mixing said thus separated reaction product with an aliphatic alcohol having a maximum of 6 carbon atoms; and refluxing said mixture of said thus separated reaction product and said alcohol so as to form the alcohol ester derivative of bis(4-hydroxycoumarin-3-yl) acetic acid.

6. Process for preparing ester derivatives of bis(4-hydroxycoumarin-3-yl) acetic acid, comprising in combination the steps of mixing bis(4-hydroxycoumarin-3-yl) acetic acid with a dehydrating agent therefor selected from the group consisting of phosphorousoxychloride, thionylchloride, sulfurous acid and acetic acid, which dehydrating agent does not react with the hydroxyl group in the 4 position on said bis(4-hydroxycoumarin-3-yl) acetic acid; refluxing said mixture so as to cause said bis(4-hydroxycoumarin-3-yl) acetic acid and said dehydrating agent to react and form a reaction mass including the dehydrated reaction product of said bis(4-hydroxycoumarin-3-yl) acetic acid; separating said dehydrated reaction product from said reaction mass; mixing said thus separated reaction product with an alcohol selected from the group consisting of methanol, ethanol, propanol, n-butanol, allyl alcohol, n-hexanol, n-heptanol, isopropanol, isobutanol, cyclohexanol, n-cetyl alcohol, benzylalcohol, ethylene glycol and propylene glycol; and refluxing said mixture of said thus separated reaction products and said alcohol so as to form the alcohol ester derivative of bis(4-hydroxycoumarin-3-yl) acetic acid.

7. The process of preparing esters of bis(4-hydroxycoumarin-3-yl) acetic acid which comprises refluxing bis(4-hydroxycoumarin-3-yl) acetic acid with a dehydrating agent selected from the group consisting of thionyl chloride, sulfurous acid, phosphorousoxychloride and acetic acid, separating the resulting product, and then refluxing said resulting product wiith a lower alkanol.

8. The process which comprises refluxing bis(4-hydroxycoumarin-3-yl) acetic acid with a dehydrating agent selected from the group consisting of thionyl chloride, sulfurous acid, phosphorousoxychloride and acetic acid, and recovering the reaction product.

References Cited in the file of this patent

UNITED STATES PATENTS

| | | |
|---|---|---|
| 2,350,388 | Claborn | June 6, 1944 |
| 2,371,281 | Claborn | Mar. 13, 1945 |
| 2,482,512 | Rosicky et al. | Sept. 20, 1949 |
| 2,601,308 | Lovas | June 24, 1952 |

FOREIGN PATENTS

| | | |
|---|---|---|
| 915,642 | France | Nov. 13, 1946 |

OTHER REFERENCES

Fucik et al.: Coll. Czech. Chim. Communs., vol. 16, pp. 296–303 (1951).

Fucik et al.: "Soc. Chim. de France" (1949), pp. 609–10.